United States Patent
Darling et al.

(10) Patent No.: US 7,972,740 B2
(45) Date of Patent: Jul. 5, 2011

(54) FUEL CELL COOLANT BUBBLE CONTROL

(75) Inventors: Robert M. Darling, South Windsor, CT (US); Evan C. Rege, Portland, OR (US); Ryan J. Balliet, Oakland, CA (US); Jeremy P. Meyers, Austin, TX (US); Craig E. Evans, Portland, OR (US); Thomas D. Jarvi, Manchester, CT (US); Sitaram Ramaswamy, West Hartford, CT (US)

(73) Assignee: UTC Power Corporation, South Windsor, CT (US)

( * ) Notice: Subject to any disclaimer, the term of this patent is extended or adjusted under 35 U.S.C. 154(b) by 1238 days.

(21) Appl. No.: 11/638,731

(22) Filed: Dec. 13, 2006

(65) Prior Publication Data

US 2007/0154747 A1   Jul. 5, 2007

Related U.S. Application Data

(63) Continuation-in-part of application No. 11/323,767, filed on Dec. 30, 2005, now abandoned.

(51) Int. Cl.
*H01M 2/38* (2006.01)

(52) U.S. Cl. ........ 429/457; 429/414; 429/456; 429/458; 429/512; 429/514

(58) Field of Classification Search ............ 429/13, 429/20, 34, 39, 414, 456, 457, 458, 459, 429/512, 514
See application file for complete search history.

(56) References Cited

U.S. PATENT DOCUMENTS

| | | | | |
|---|---|---|---|---|
| 6,306,530 | B1 * | 10/2001 | Blondin et al. | 429/13 |
| 7,087,337 | B2 | 8/2006 | Trabold et al. | |
| 2003/0124414 | A1 * | 7/2003 | Hertel et al. | 429/44 |
| 2003/0219635 | A1 * | 11/2003 | Lee et al. | 429/13 |
| 2005/0064261 | A1 * | 3/2005 | Breault et al. | 429/32 |

FOREIGN PATENT DOCUMENTS

| | | | |
|---|---|---|---|
| JP | 2001-043869 | * | 2/2001 |
| WO | WO 2005/078821 | | 8/2005 |

OTHER PUBLICATIONS

Kohnle, J. et al, "A Unique Solution for Preventing Clogging of Flow Channels by Gas Bubbles", IEEE0-7803-7185-2/02, (date not known), pp. 77-80.

Allen, Jeffrey S., "Capillary-Driven Flow in Liquid Filaments Connecting Orthogonal Channels", Slides used in presentation at Computational Fuel Cell Dynamics Workshop, Banff, Canada, Apr. 19-25, 2003, (Pages not numbered; Index refers to pp. 2-42), (publication information not known).

* cited by examiner

*Primary Examiner* — Patrick Ryan
*Assistant Examiner* — Ben Lewis
(74) *Attorney, Agent, or Firm* — M. P. Williams

(57) ABSTRACT

To mitigate bubble blockage in water passageways (78, 85), in or near reactant gas flow field plates (74, 81) of fuel cells (38), passageways are configured with (a) cross sections having intersecting polygons or other shapes, obtuse angles including triangles and trapezoids, or (b) hydrophobic surfaces (111), or (c) differing adjacent channels (127, 128), or (d) water permeable layers (93, 115, 116, 119) adjacent to water channels or hydrophobic/hydrophilic layers (114, 120), or (e) diverging channels (152).

2 Claims, 15 Drawing Sheets

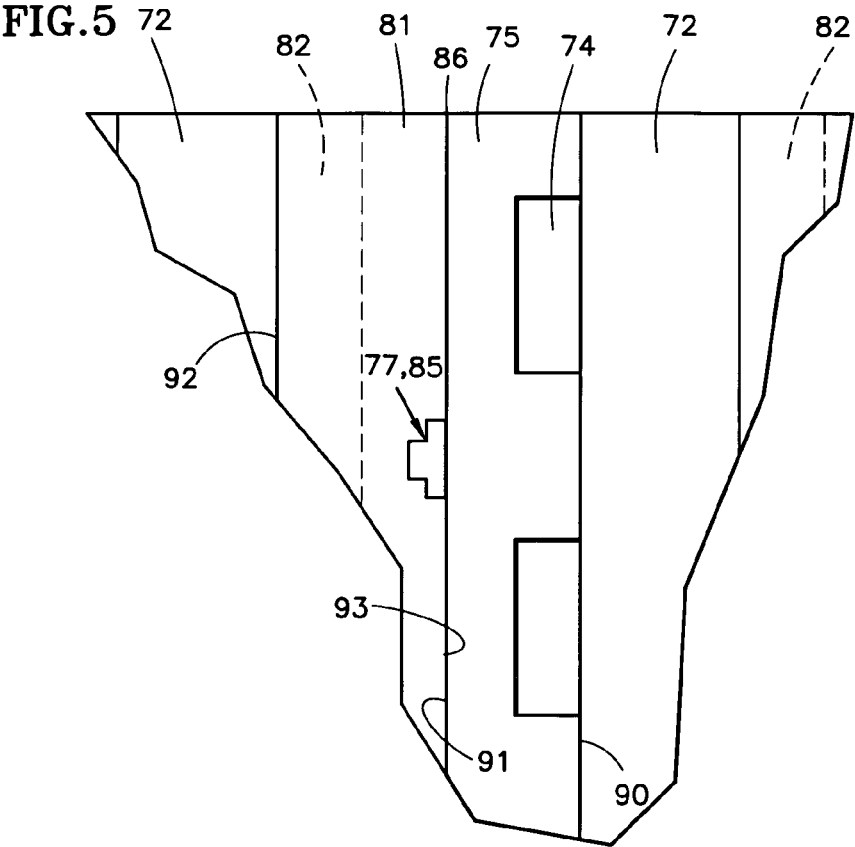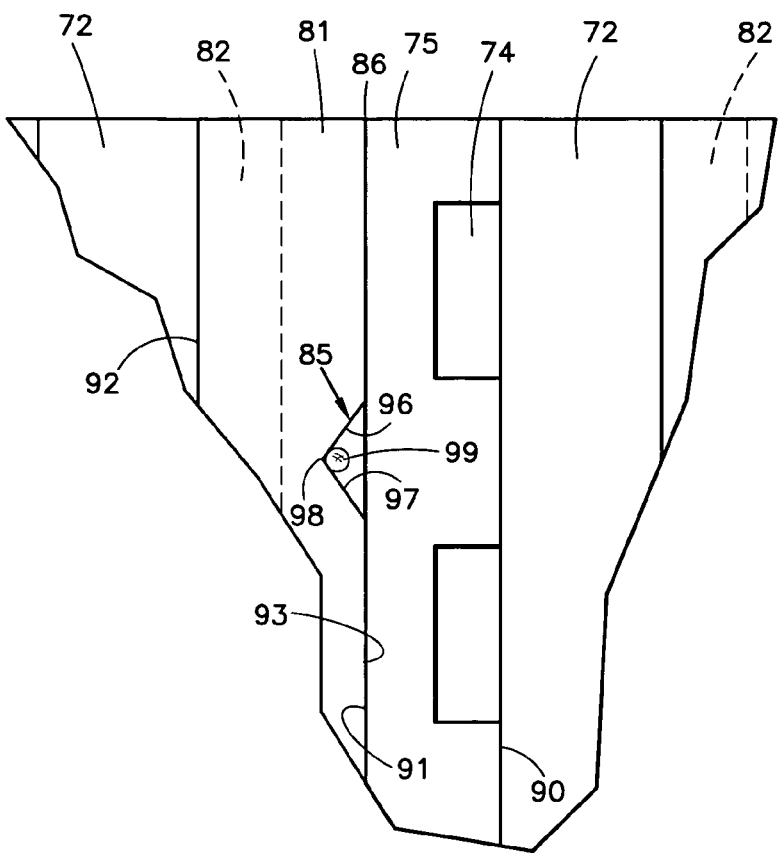

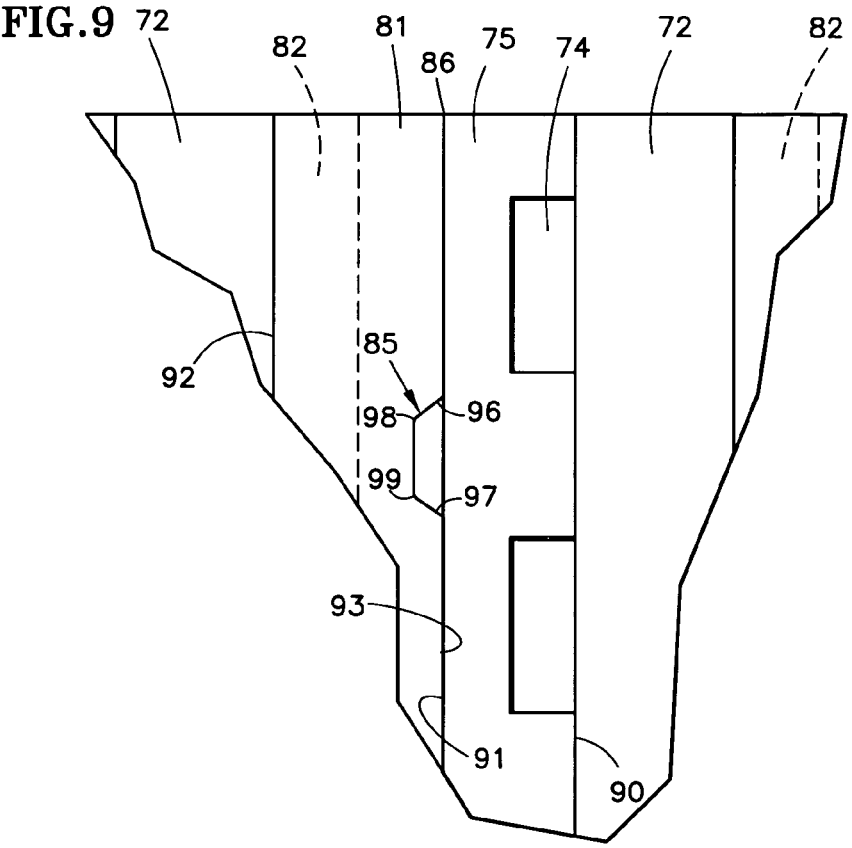
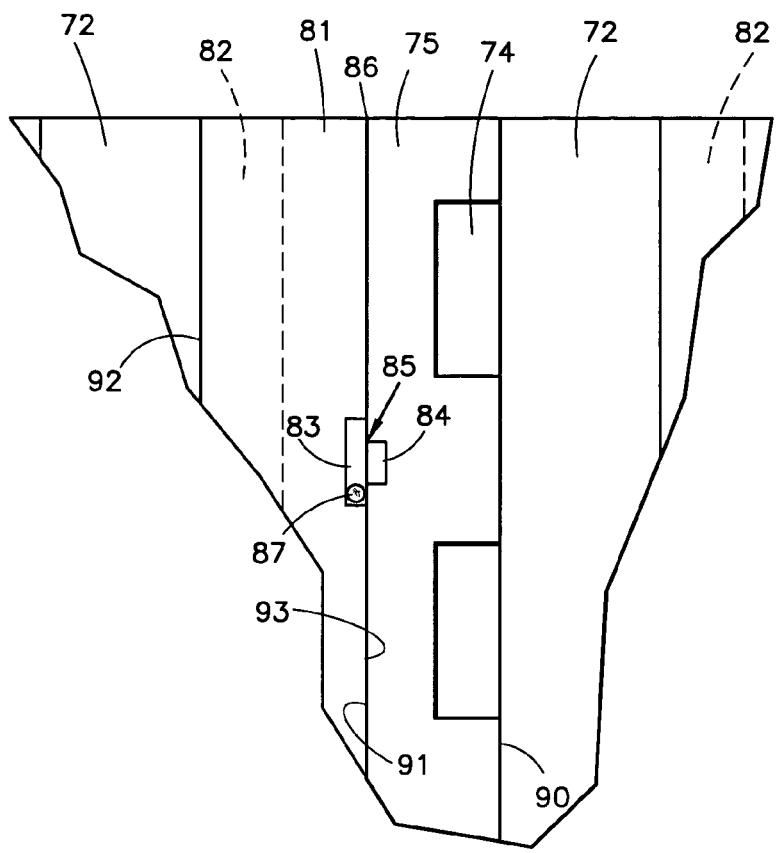

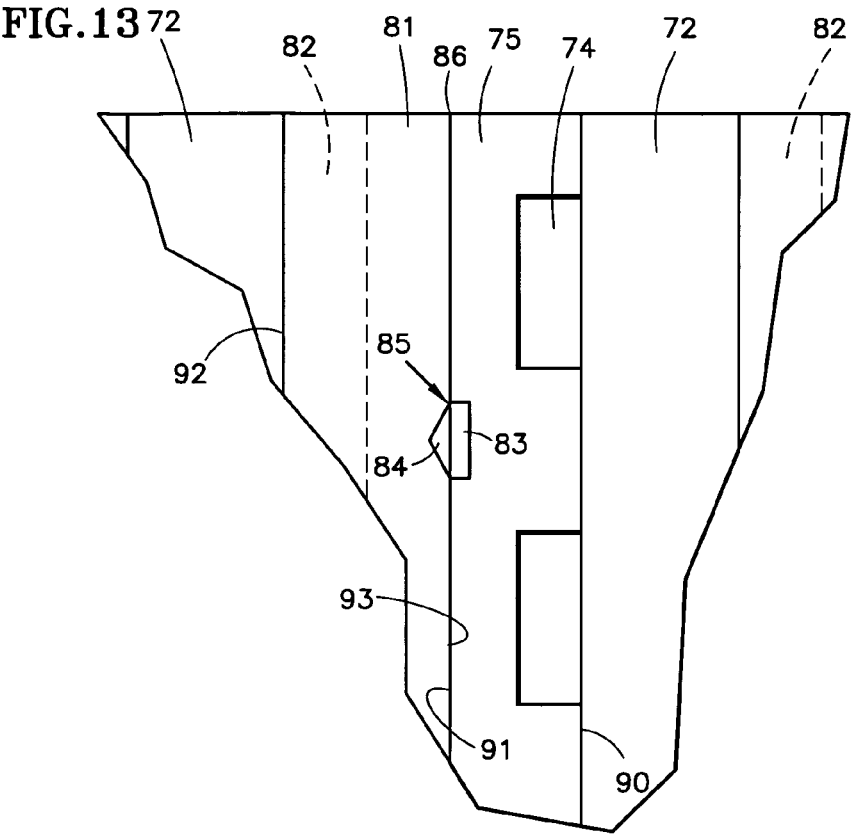
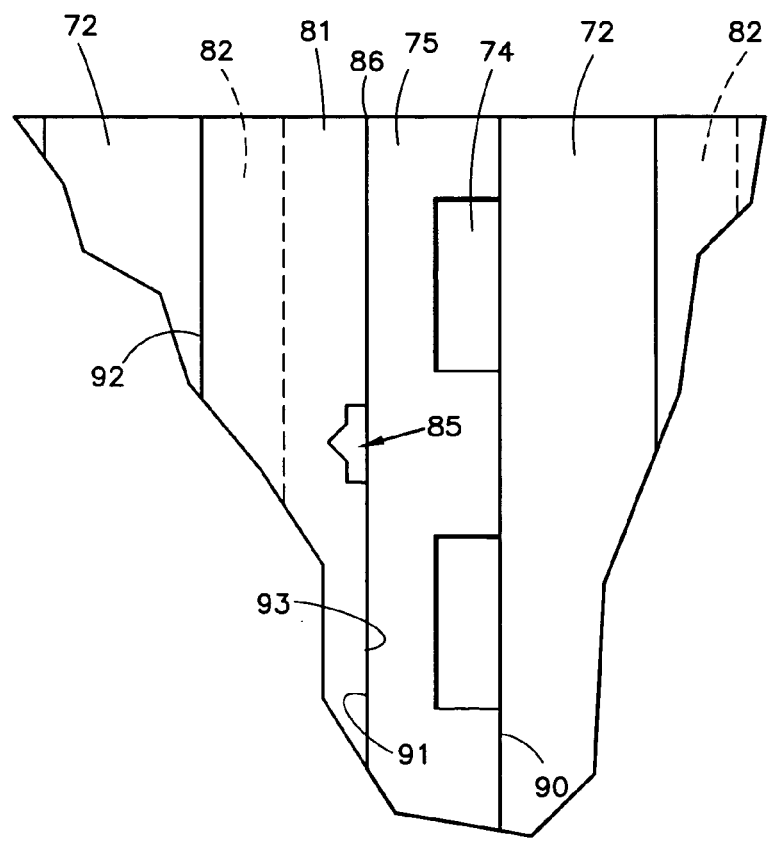

FUEL CELL COOLANT BUBBLE CONTROL

CROSS REFERENCE TO RELATED APPLICATIONS

This application is a continuation-in-part of U.S. Ser. No. 11/323,767 filed on Dec. 30, 2005 now abandoned.

TECHNICAL FIELD

Coolant passageway configuration reduces gas bubble blockage in small, low flow coolant passageways of fuel cells.

BACKGROUND ART

In order to reduce the exposure of proton exchange membrane (PEM) fuel cells to problems resulting from freezing temperatures, and to reduce reliance on water pumps and other plumbing as accessories to the fuel cells, the total volume of coolant in the fuel cells may be reduced.

However, in systems which do not use either a coolant pump or a gas venting micropump, and have minimal external water plumbing, the flow rate of coolant in the cells is quite low. If only gas is vented from the coolant passageways, water flow is limited to that which evaporates into the reactant gases. With small passageways and low water flow, gas bubbles may join together (aggregate) and block water flow from large areas of the water channels, sometimes referred to as "gas breakthrough" of the reactant gas flow field plates, thereby causing localized heating and dehydration of the membrane at various spots, resulting in degradation of components and reduced performance.

Systems employing between-cell coolant plates, which have glycol or other coolants, may have extremely small, in-cell water passageways to provide low flows of water to the anode side of the fuel cells for hydration, with insignificant cooling resulting from the water flow.

SUMMARY

Coolant flow is assured in small fuel cell coolant passageways, mitigating bubble blockage of coolant flowing at a low flow rate in fuel cell coolant passageways; gas bubbles are assisted in flowing through coolant passageways of PEM fuel cells; venting of gas in PEM fuel cell coolant passageways is improved; flow of gas toward a vent is improved in PEM fuel cells; PEM fuel cell hydration is improved; and cooling is improved in PEM fuel cells.

Although the ultimate purpose herein is to assure that coolant flow will not be blocked in small coolant passageways of a fuel cell, the removal of coolant-blocking gas bubbles is achieved by addressing the gas flow characteristics of the coolant passageways. The realization that gas, typically gas bubbles, present in small fuel cell coolant passageways having low coolant flow rates, may be propelled in properly designed passageways which assure sufficient flow of coolant through the coolant passageways to the vents, thereby ensuring an adequate flow of coolant for operational purposes, rather than blockage of coolant by gas bubbles.

As coolant flow passageways become smaller, they become more prone to being blocked by bubbles of any gas therein. For a given cross sectional area of a prior art coolant passageway, there is a threshold coolant flow rate at or below which bubbles will block the coolant passageways if gas is present in the coolant; at coolant flow rates above the threshold, bubbles will be swept along by the flow of coolant, and will not block the coolant passageway.

As used herein, the term "fuel cell" may mean the apparatus for a complete, operative fuel cell capable of producing electricity from oxidant and fuel reactant gases, or where the context so requires, that term may mean the portion of a fuel cell exclusive of layers that provide coolant to the fuel cells, which may be disposed between adjacent ones of said fuel cell portions.

As used herein, the term "liquid coolant" means a coolant which is in the liquid state when the fuel cell is operating, even though such liquid coolant may freeze and become a solid when the fuel cell is not operating and the ambient temperature is below the freezing point of the coolant. The coolant may be water or other liquid; herein, "liquiphobic" is defined as having an aversion to the coolant, or lacking an affinity for the coolant, and "liquiphilic" is defined as having an affinity for, or lacking an aversion to, the coolant. The coolant flow assisted herein may, in some cases, be used primarily for hydration, with minimal cooling effect. Coolant flow paths and passageways herein are distinct from fuel and oxidant reactant gas flow field channels.

As used herein, the term "coolant passageways" refers to those portions of the coolant flow path in a fuel cell stack which are substantially coextensive with the planform (the in-plane outline) of the fuel cells.

Accordingly, gas tolerant coolant passageways of fuel cells promote flow of coolant within such passageways with or without the presence of gas. The gas tolerant configurations are provided along substantially the entire length of coolant passageways, thereby to provide a contiguous gas flow capability from inlets of said passageways to outlets thereof.

In one form, gas tolerant fuel cell coolant passageways are configured to provide portions for which gas has an affinity, that is, a propensity to migrate to such portions and to flow therein, in contrast with other portions of the passageways where coolant may flow without interference from gas, thereby to assure that there is room for coolant to flow without being blocked by gas bubbles.

Further, coolant passageways having gas tolerant cross sections may comprise first portions conducive to presence of gas preferentially in comparison with second portions which are less conducive to the presence of gas than the first portions.

Gas tolerant passageways herein may comprise first and second portions within the same passageways: the first portions may be adjacent to a wall of a passageway which is liquiphobic; the first portions may each comprise a corner which subtends more than 90° between two walls of a passageway; the first portions may comprise a portion of a triangle, a trapezoid or other polygon away from acute angular areas thereof; or they may comprise combinations of the foregoing.

In one form, the gas bubbles in the coolant channel are caused to be metastable by water channels which are diverging. "Diverging" is defined herein to mean having a cross section of incrementally increasing size at corresponding incrementally increasing distances from the inlet of each channel. The bubble seeks to minimize its surface energy by seeking out a position in the channel where it will more closely approach having a spherical form. Diverging channels cause the metastable bubbles to move in the direction toward the exit of the channel, which is the direction of water flow, ensuring that blockage of water flow as a result of gas in the channel will be minimized.

The flow of coolant is the purpose, rather than the flow of gas; however, the control of gas flow is accomplished by affecting the characteristics of the coolant channels with respect to gas: that is, while the coolant flow characteristics at low flow rates are essentially the same in one portion of the gas tolerant coolant passageways as in other portions thereof, provides certain portions of gas tolerant channels are provided for which gas has an affinity. Therefore, affecting the flow of gas within the passageway accomplishes the flow of coolant within the passageway, whether or not gas is present.

Other features and advantages will become more apparent in the light of the following detailed description of exemplary embodiments thereof, as illustrated in the accompanying drawing.

BRIEF DESCRIPTION OF THE DRAWINGS

FIGS. 4-9 are fragmentary, sectioned, side elevation views of gas tolerant coolant channels, with the portion for which gas has a proclivity oriented toward the fuel reactant gas flow fields as follows:

FIG. 4—intersecting rectangles formed in adjoining plates;

FIG. 5—intersecting rectangles formed in the oxidant reactant gas flow field plate;

FIG. 6—triangle formed in the oxidant reactant gas flow field plate;

FIG. 7—intersecting rectangle and triangle formed in adjoining plates;

FIG. 8—intersecting triangle and rectangle formed in the fuel reactant gas flow field plates;

FIG. 9—trapezoid formed in the oxidant reactant gas flow field plate;

FIGS. 10-15 are respective variants of FIGS. 4-9, with the portion of the coolant passageway for which gas has a proclivity oriented toward the oxidant reactant gas flow fields.

MODE(S) FOR IMPLEMENTATION

Figure 1:
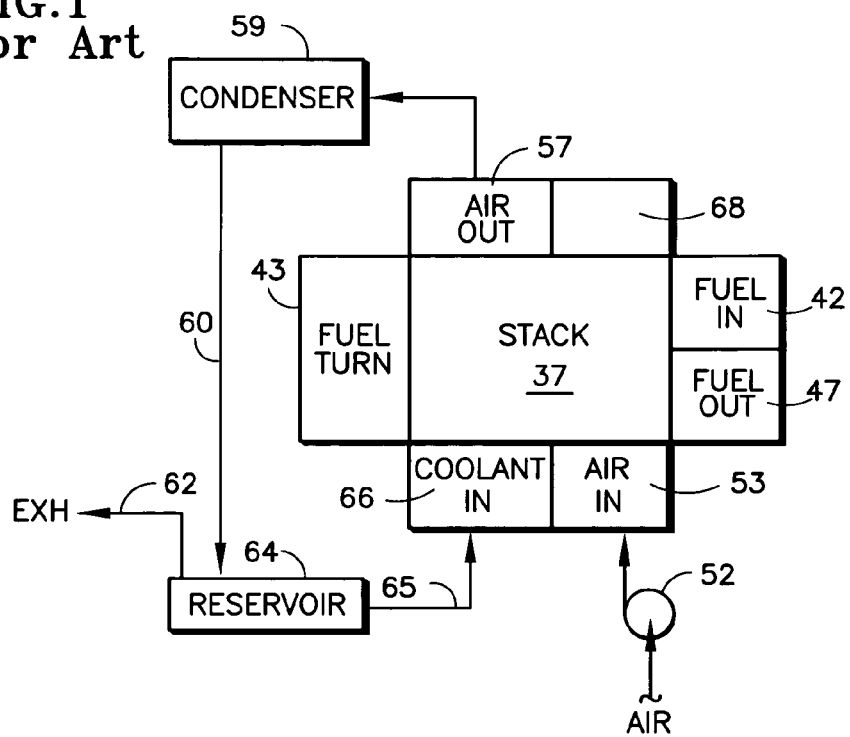
FIG. 1 is a simplified, stylized block diagram of an evaporatively cooled fuel cell system, which may be modified to employ gas tolerant coolant flow.
Figure 2:
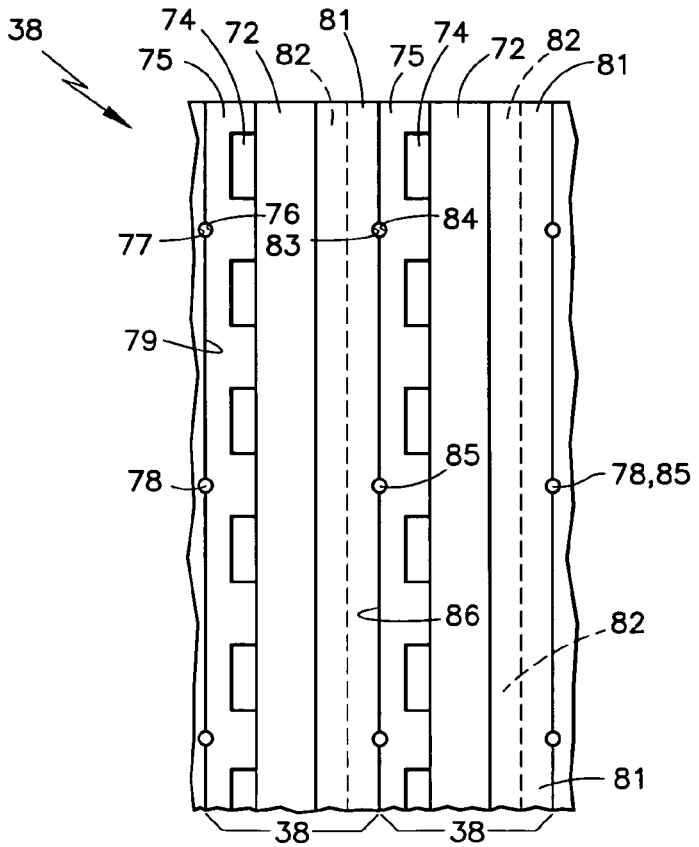
FIG. 2 is a partial, sectioned side elevation view of a pair of fuel cells employing minute water passageways, with the sectioning lines omitted for clarity.

A fuel cell system employing evaporative cooling is disclosed in U.S. Ser. No. 11/230,066 filed Sep. 19, 2005, now publication No. US2006-0141331 and described with respect to FIGS. 1 and 2 herein. In the aforementioned application, water evaporates into air, pumped 52 through an air inlet 53, within the oxidant reactant gas (air) flow fields in the stack 37 thereby cooling the fuel cells 38 (FIG. 2). The outflow 57 of the oxidant reactant gas channels passes through a condenser 59 wherein heat is removed and the water is recovered and returned over a conduit 60 to a water/gas separator 64 which also serves as a reservoir. Any gas separated from the water is removed through exhaust 62, the water returning via a conduit 65 and a coolant inlet 66 to the water passageways in the stack 37 and upward toward an outlet 68.

In FIG. 2, fuel cells 38 each comprise a conventional membrane electrode assembly 72, which includes an electrolyte with anode and cathode catalysts on opposite sides thereof and may include a gas diffusion layer on one or both electrodes. Fuel reactant gas flows through channels 74 in a fuel reactant gas flow field plate 75 having grooves 76, which together with grooves 77 of an adjacent fuel cell, form minute water passageways 78 at a juncture 79 of the fuel cells 38. On the cathode side, an oxidant reactant gas flow field plate 81 includes air flow channels 82 and grooves 83 which, with grooves 84 on an adjacent fuel cell, together form minute water passageways 85 at a juncture 86 of the fuel cells.

To prevent flooding, pressure of water in the passageways is between one and ten Kilopascals lower than the pressure of the reactant gases, such as provided by an air pump and pressure-regulated fuel.

The passageways may be formed other than by matching grooves as shown, such as by channels 76, 83 or 77, 84 provided in only one of the reactant gas flow field plates 75, 81.

The reactant gas flow field plates 75, 81 appear to be the same as water transport plates, sometimes referred to as fine pore plates, in a fuel cell power plant which utilizes significant water flow through the water transport plates, with external water processing, as is disclosed in U.S. Pat. No. 5,700, 595. However, because there is about a 40 times improvement in cooling effectiveness per volume of water when evaporative cooling is used, the water flow channels of the aforesaid '595 patent have cross sections which are several tens of times larger than the cross sections of the water passageways 78, 85 in FIG. 2.

In another embodiment of the aforementioned patent application, there is a material which is conductive, hydrophilic and has a high permeability to water, extending over substantially the entire planform of the reactant gas flow field plates 75, 81 in place of grooves forming passageways 78, 85. Such material may be carbon fiber paper, with fibers aligned in the direction of water motion to help with in-plane water permeability, or it may be other material conventionally used as fuel cell diffusion media.

The water passageways are typically very small and capable of providing the water required for evaporative cooling. Water flow in addition to that needed for evaporative cooling can assist in removing gas bubbles which leak in from the reactant gas channels, and may assist in deionizing (demineralizing) water which is circulating in the system. Such water flow can be adequate if provided by a pump and plumbing external to the fuel cells.

Figure 3:
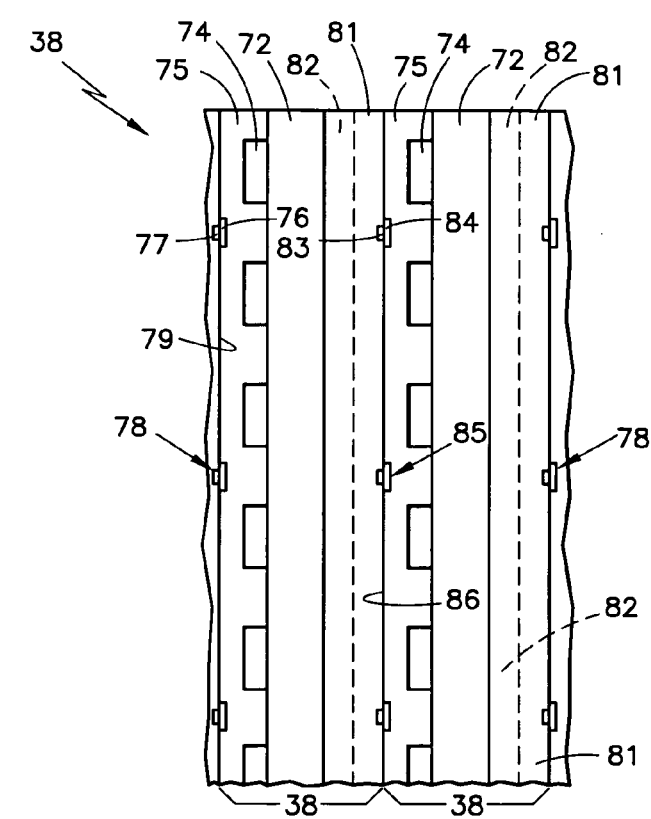
FIG. 3 is a partial, sectioned, side elevation view of a pair of fuel cells employing gas tolerant coolant channels, with the sectioning lines omitted for clarity.
Figure 4:
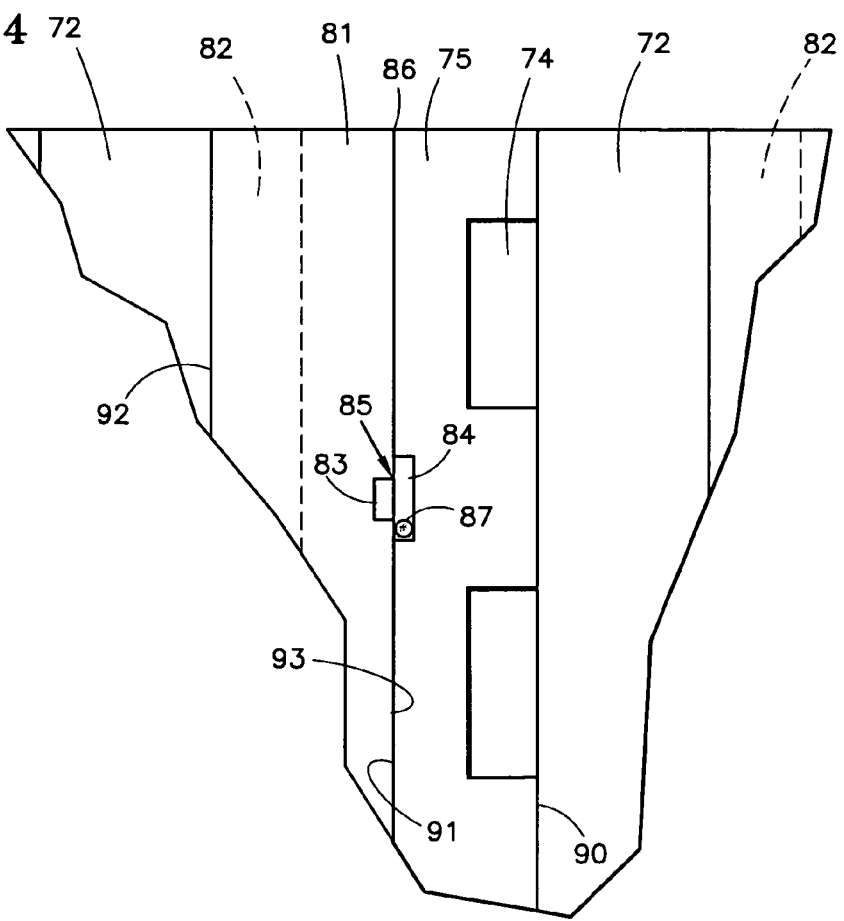

Herein, that portion of fuel cell coolant paths which are substantially coextensive with the general planform of the fuel cells comprise gas tolerant coolant passageways, such as the passageways 78, 85 in FIGS. 3 and 4. The general planforms of fuel cells are normal to FIGS. 2-22, and are illustrated (in specific forms) in FIGS. 23 and 24. Gas tolerant coolant passageways 78, 85 comprise rectangular channels 76, 84 extending inwardly from a surface 91 of the fuel reactant gas flow field plates 75, opposite to a surface 90 from which the fuel flow field channels 74 extend, and channels 77, 83 having rectangular cross sections, significantly smaller than the cross sections of the channels 76, 84. The channels 77, 83 extend from a surface 93 of the oxidant reactant gas flow field plate 81 which is opposite to a surface 92 from which the oxidant reactant gas channels 82 extend. This is one embodiment of gas tolerant coolant channels comprising intersecting closed plane figures, such as polygons.

There is a tendency for any gas within the passageways 78, 85 to migrate and/or be retained in the larger rectangles 76, 84, rather than in the smaller rectangles 77, 83. As illustrated by the bubble 87, the first portion of the coolant passageways formed by the large rectangles 77, 83 is conducive to the presence of gas preferentially over the second portion of the passageways which comprises the small rectangles 76, 84. As a consequence, bubbles that aggregate do so in the larger rectangles 76, 84, thereby leaving the smaller rectangles 77, 83 free from any bubble blockage. This assures that the flow of coolant necessary for proper fuel cell operation will occur in the smaller rectangles 77, 83.

As a result of the flow of coolant in the smaller rectangles 77, 83, as well as in the larger rectangles 76, 84 wherever bubbles are not blocking the larger rectangles, the flow of water will sweep the bubbles toward the vent 68 (FIG. 1), assuring that the bubbles will not aggregate to the extent that the entire channels 78, 85 are filled with gas. Thus, an assured water flow, substantially not subject to blockage by gas bubbles, is capable of sweeping the gas bubbles toward a gas vent.

As illustrated in FIG. 5, the channels 77, 85 may be formed directly within the oxidant reactant gas flow field plates 81, extending from the surface 93 thereof, rather than two rectangles separately made in the fuel reactant gas flow field plates 75 and in the oxidant reactant gas flow field plate 81, as in FIG. 4.

Another form, illustrated in FIG. 6, provides gas tolerant coolant channels 85 which are triangular in shape. In the embodiment of FIG. 6, an isosceles triangle is shown with its base in the same plane as the plane of the surface 93. In this embodiment, the acute angles 96, 97 at the surface 93 are smaller than the obtuse angle 98 away from the surface, and the bubbles tend to aggregate near the obtuse angle 98, as illustrated by the bubble 99. As is seen by the bubble 99, the gas has a proclivity to collect in the portions of the coolant passageways 85 adjacent to the obtuse angles 98 preferentially in comparison with the acute angles 96, 97 of the coolant passageways 85. This means that the coolant can flow readily away from the apexes 98 of the channels 85, closer to the fuel reactant gas flow field plates 75. In the embodiment of FIG. 6, with coolant flowing adjacent to the fuel reactant gas flow field plates 75, humidification of the anode side of the unitized electrode assembly 72 is assured.

The triangular cross sections of the gas tolerant coolant passageways 85 may be equilateral, or they may be either scalene or isosceles right triangles. Or, they may be scalene triangles other than right triangles. However, since the gas will tend to migrate toward and/or remain in large, obtuse corners, in preference over small, acute corners, an equilateral triangle is probably not as useful as one in which the angles 96, 97 near the surface 93 are acute and smaller than the apex 98 away from the surface 93; the apex in such case is greater than 180°/N. Capillary flow may occur in a corner of a liquid passageway if $$\theta < \frac{\pi}{2} - \alpha,$$

where α=half angle of the corner and θ=static contact angle of the liquid. For an equilateral triangle, 2α=60° and α=30°; θ<90−30=60; so if the contact angle is less than 60°, capillary flow of liquid will occur in the corner. High capillary pressure is defined as that which is sufficient to assure a non-zero flow of coolant through a coolant passageway.

In the general case, this form will have one angular intersection of sides of the coolant channel which has an angle greater than 180°/N, where N is the total number of sides (including an open portion substantially in the plane of one of the surfaces 91, 93). Thus, one of the angles of a triangular passageway, typically the apex, will be greater than 60°.

Figure 7:
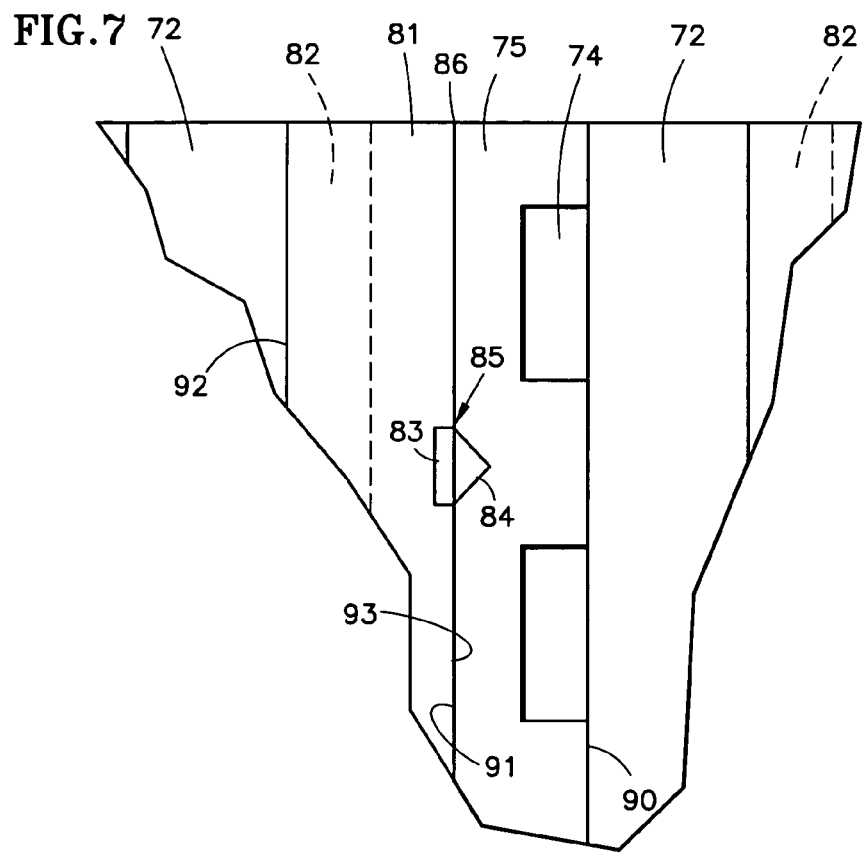

Referring to FIG. 7, a triangular channel 84 extends from the surface 91 of the fuel reactant gas flow field plate 75, intersecting with a rectangle 83 extending from the surface 93 of the oxidant reactant gas flow field plate 81. In this case, bubbles will collect in the triangular channels 84, allowing coolant to flow freely in the rectangular channels 83, the flow sweeping the bubbles along toward the vent 68 (FIG. 1).

Figure 8:
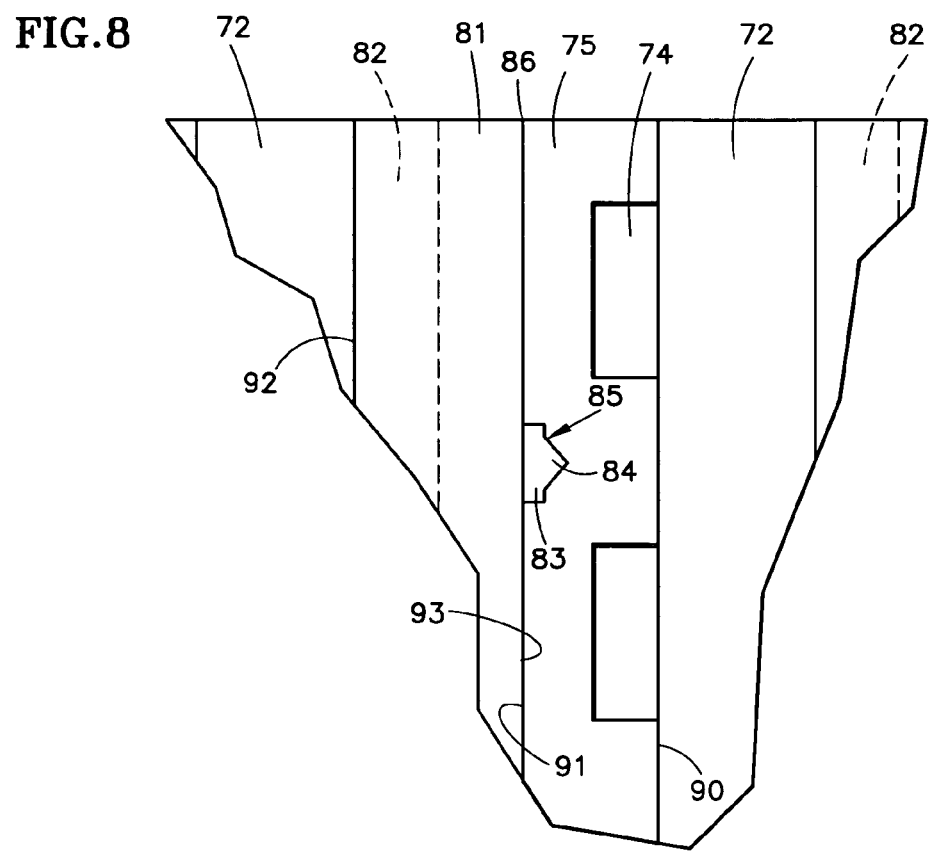
Figure 11:
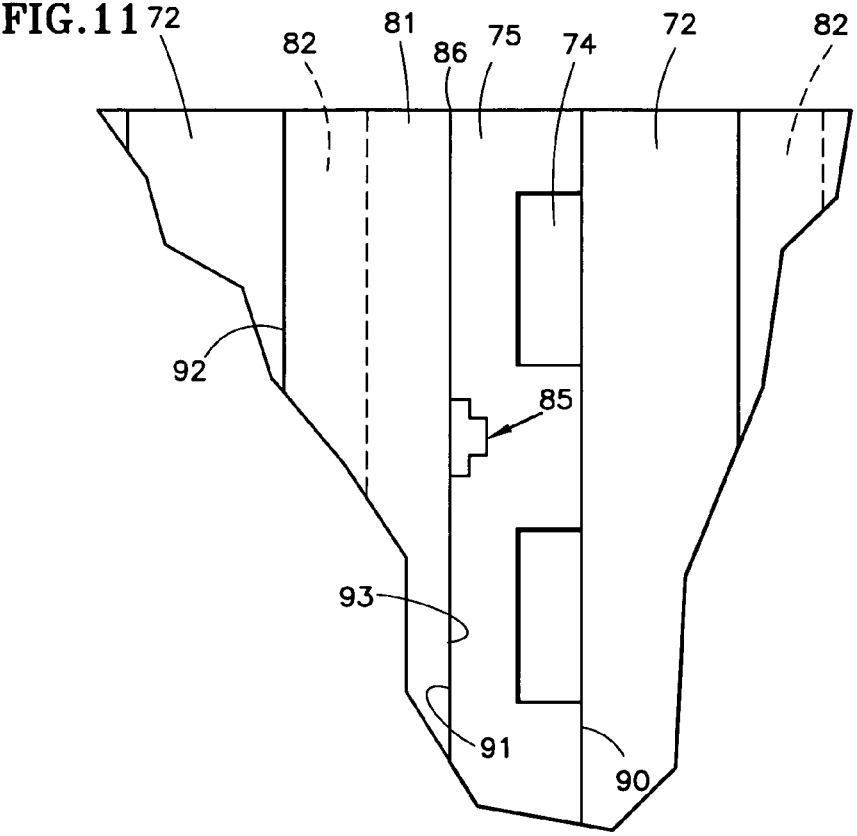
Figure 12:
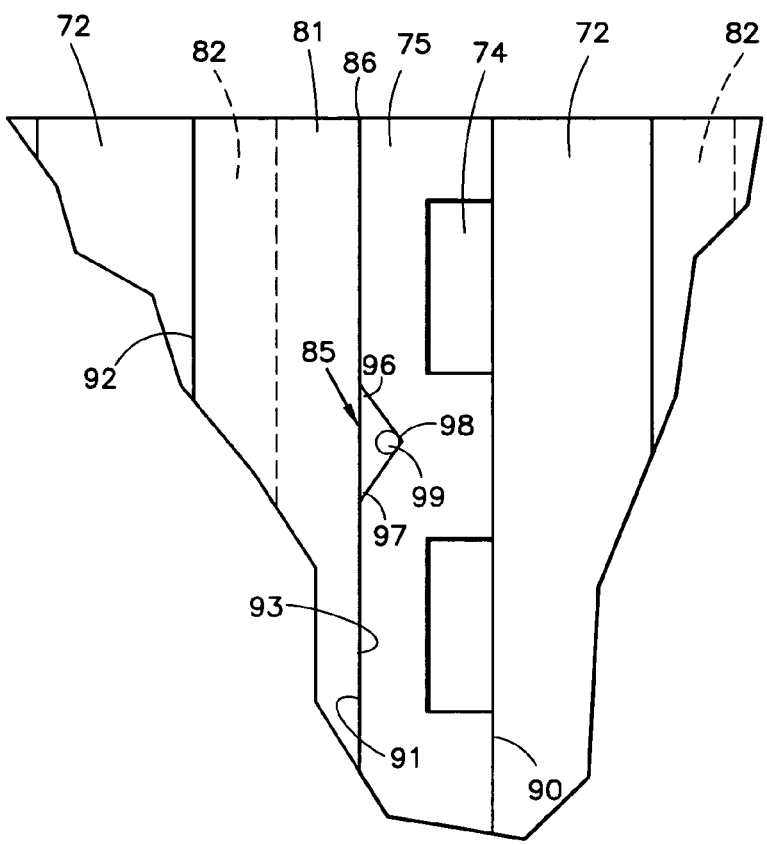
Figure 15:
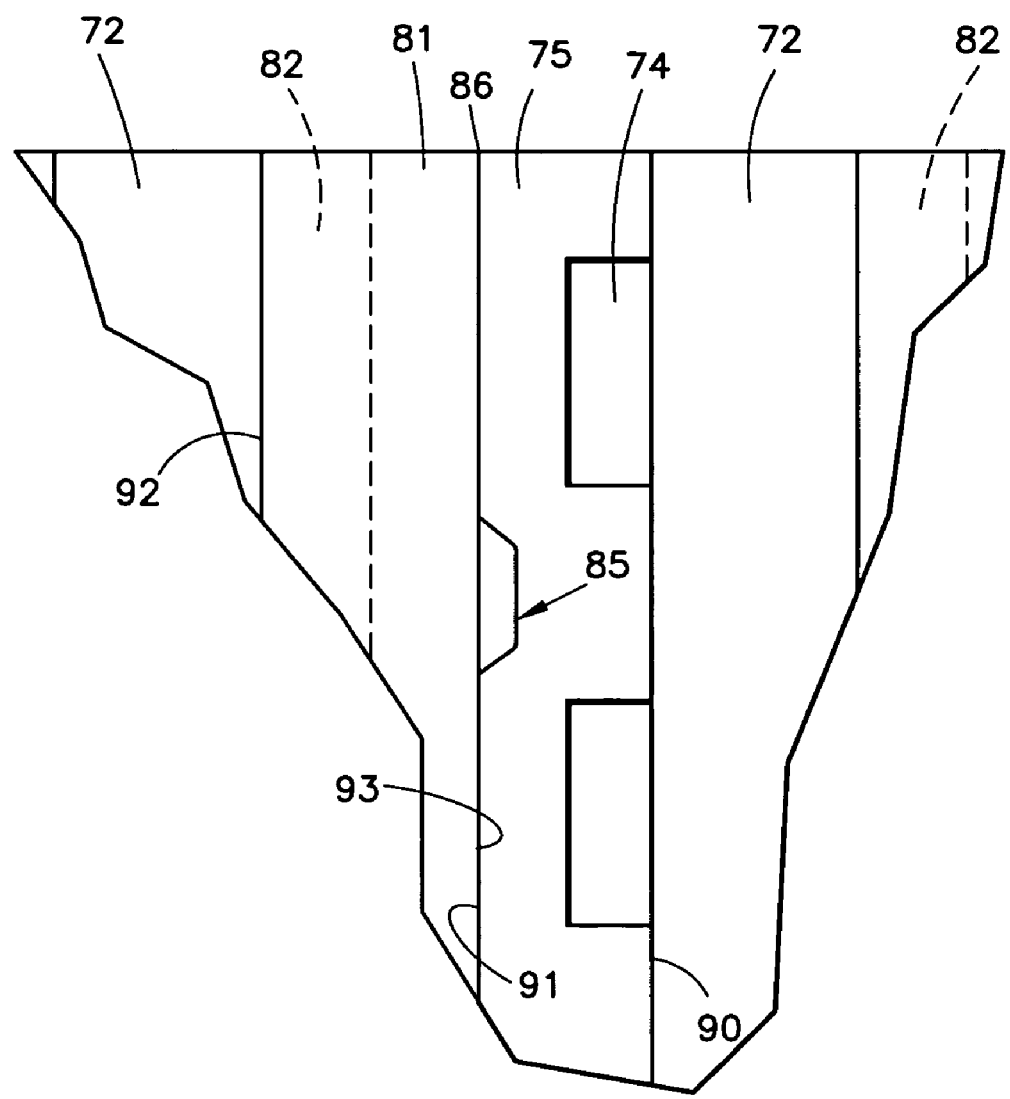

FIG. 8 illustrates that a triangle 84 intersecting with a rectangle 83 may both extend from the edge 91 of the fuel reactant gas flow field plate 75. Although the embodiments of FIGS. 3-8 comprise intersecting polygons, in the general case, the gas tolerant coolant passageways may have cross sectional areas which comprise the intersection of two closed plane figures bounded by other than straight lines (having at least some curvilinear boundaries) as well as closed plane figures bounded by straight lines (polygons).

FIG. 9 illustrates that the gas tolerant coolant channels 85 may have a trapezoidal cross section. In such a case, the gas tends to migrate or remain away from the acute angles 96, 97 opposite to the surface 93 of the oxidant reactant gas flow field plates 81. Coolant is free to flow near the acute angle portions of the trapezoidal cross section, and the flow of coolant sweeps the gas bubbles along toward the vent 68 (FIG. 1). The obtuse angles 98, 99 are greater than 180°/N.

In FIGS. 4-9, there are first portions of the gas tolerant coolant passageways, such as the large rectangles 83 of FIG. 4 or the obtuse angles of the triangular passageways 85 of FIG. 6, to or in which the gas will migrate and/or flow, preferentially to second portions, such as the small rectangle of FIG. 4 or the acute angles of the triangular shaped gas tolerant coolant passageways 85 in FIG. 6, or the trapezoid of FIG. 9. The gas has an affinity for the first portions which allows coolant to flow, unfettered by bubbles, in the second portions. In this form, the water or other coolant will flow at a low flow rate in large or small channels and in corners or other parts of passageways; but to ensure that flow, the gas must be segregated to first portions of the passageways so that within the second portions of the passageways, which are less preferential to the migration or retention of gas bubbles, the water or other coolant will flow unimpeded by bubbles to achieve product water removal, hydration and/or evaporative cooling as required, while at the same time sweeping the bubbles toward the vent.

In the general case, gas tends to leak from the fuel reactant gas flow field plate into the coolant passageways of a fuel cell. For that reason, the portions of gas tolerant coolant passageways for which the gas has an affinity might preferably be disposed toward the fuel reactant gas flow field plate, whereas those portions of gas tolerant coolant passageways which are less conducive to gas bubbles will be positioned toward the oxidant reactant gas flow field plate. In the case of gas tolerant water passageways utilized in evaporatively cooled fuel cells, this assures that water will easily reach and be evaporated into the oxidant reactant gas flow field channels 82.

Each of FIGS. 10-15 respectively corresponds to one of FIGS. 4-9 and illustrates that the configuration can be reversed from that illustrated in FIGS. 4-9 so as to provide the first portions to which or in which the gas preferentially migrates or remains is closer to the oxidant reactant gas flow field channels, whereas the second portion, which is less preferential to the gas, and thereby assures the presence and flow of water, is toward the fuel reactant gas flow field channels. The embodiments illustrated in FIGS. 10-15 are useful in fuel cell stacks wherein humidification of the anode side of the proton exchange membrane is of paramount concern. These are useful, for instance, in fuel cell power plants wherein the stack is cooled by means of coolant plates having a non-freezable coolant, such as a water glycol mixture, but water is circulated adjacent to the fuel reactant gas flow field plates to humidify the proton exchange membrane.

Figure 16:
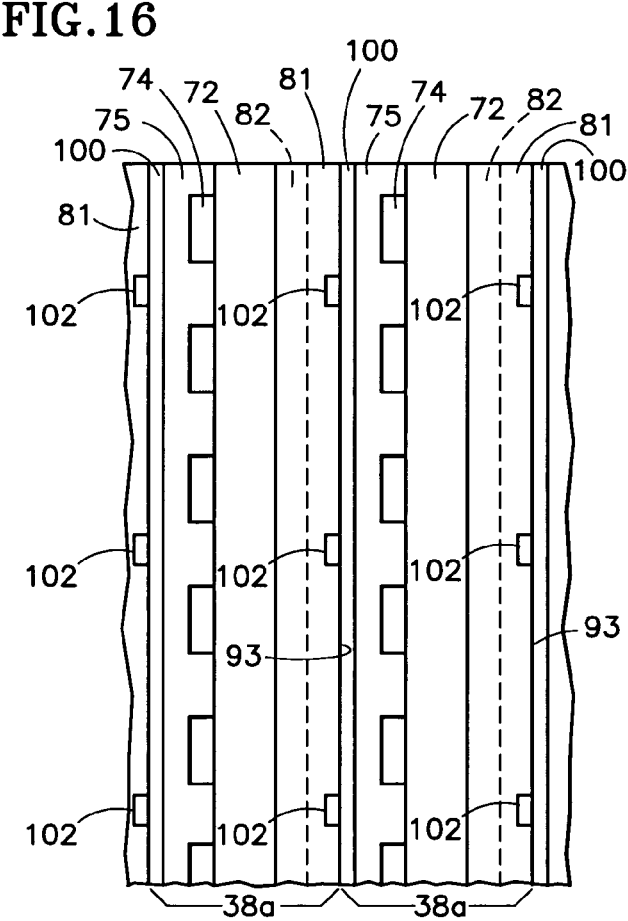
FIG. 16 is a partial, sectioned, side elevation view of a pair of fuel cells employing a layer highly permeable to coolant with adjacent coolant channels.

Referring to FIG. 16, a pair of fuel cells 38*a* have gas tolerant coolant passageways which include a porous, conductive layer 100 that is highly permeable to water, disposed adjacent to the entire active area of the planform of the fuel reactant gas flow field plate. Coolant passageways also comprise channels, such as rectangular channels 102 preferably extending from the surfaces 93 of the oxidant reactant gas flow field plates 81 which are opposite to the surfaces 92 from which the oxidant reactant gas flow field channels 82 extend. However, if desired in any given case, the channels could extend from the surfaces of the fuel reactant gas flow field plates. The permeable layer 100 may be formed of wettable carbon fiber paper, such as the commonly used TORAY® paper, which has been treated with tin in a conventional manner. Some fuel cell stacks have high ingestion of gas into the fuel reactant gas channels, which the porous layer helps to prevent.

Although a gas bubble may form in one of the channels 102 thereby tending to block water in that channel, the highly permeable layer 100 will conduct water, freely, around the bubble-blocked channel, from other channels 102 to the entire planform of the fuel reactant gas flow field plates 75. The water flows faster within the permeable layer 106 than in channels 102, and causes a pressure drop from the coolant inlet to the vent 68 (FIG. 1) which will propel bubbles in the channels 102 along toward the vent 68.

Thus, the highly permeable layer 100 is disposed between the oxidant reactant gas flow field plate of each fuel cell and the fuel reactant gas flow field plate of the fuel cell adjacent thereto in said stack; of course, the highly permeable layer adjacent to the oxidant reactant gas flow field plate in a fuel cell which is at the cathode end of the stack will not be adjacent, in the usual case, to any fuel reactant gas flow field plate. As used herein, the term "each fuel cell" excludes the last fuel cell at the cathode end of the stack, which has a highly permeable layer next to its oxidant reactant gas flow field plate, but that layer is not typically adjacent to any fuel reactant gas flow field plate, there being none beyond the last fuel cell at the cathode end of the stack.

In addition, the highly permeable layer 100 allows water to move rapidly around any bubble that may be blocking an adjacent water channel. This prevents local dry-out of the fuel gas flow field plate, thereby avoiding "breakthrough, which allows gas to pass freely through the flow field plate. In this way, the layer 100 substantially "blocks" the flow of reactant gas from the fuel reactant gas flow field channels 74 and the oxidant reactant gas flow field channels 82 to the water passageways 102. Thus, the formation of gas bubbles within the coolant water passageways 102 is reduced, and the effect of such bubbles, in blocking water from various parts of a fuel cell planform, is also reduced.

Figures 17, 18:
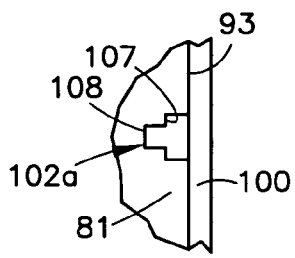
FIG. 17 is a fragmentary expanded view of the channels and layers of FIG. 16.
FIGS. 18 and 19 are fragmentary views of intersecting rectangles and triangles associated with the highly permeable layer of FIG. 16.

In FIG. 16, the water passageways 102 are rectangular, as illustrated in a larger form in FIG. 17, because passageways 102 of rectangular cross section are readily utilized without gas bubble problems when the highly permeable layer 100 is utilized adjacent to the passageways 102.

However, if deemed necessary in any given utilization of the highly permeable layer 100, such as in the case of desiring to have water passageways 102 of extremely small cross section, the cross section of the water passageways 102 may provide additional gas tolerance. For instance, a channel configuration illustrated in FIG. 18 has a first rectangular groove 107 extending from the second surface 93 of the oxidant reactant gas flow field plate 81 and a second rectangular groove 108, smaller than the first groove, extending from the first rectangular groove 107 toward the first surface 92 of the oxidant reactant gas flow field plate 81. This configuration will permit gas bubbles to form and perhaps to aggregate with other bubbles to make larger bubbles in the channels 107, while the groove 108, being less conducive to gas migration and retention, provides for a contiguous water path throughout the planform of each fuel cell, as described with respect to FIGS. 3 and 4 hereinbefore.

Figure 19:
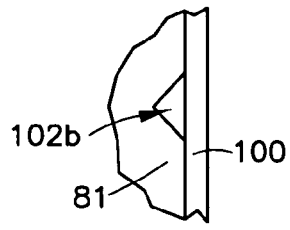

The passageways may be triangular, as shown by the passageway 102*b* in FIG. 19. The base of the triangle is in a plane coextensive with the second surface 93 of the oxidant reactant gas flow field plate 81. This configuration, having two acute angles and an obtuse angle causes gas to flow in the small angles, allowing free flow of water in the areas remote from the obtuse angle, as described with respect to FIG. 6 hereinbefore.

The water passageways can be of other configurations since employment of the highly permeable layer 100 avoids the problem of water passageways being blocked by air bubbles when there is a very low flow rate of water.

Figure 20:
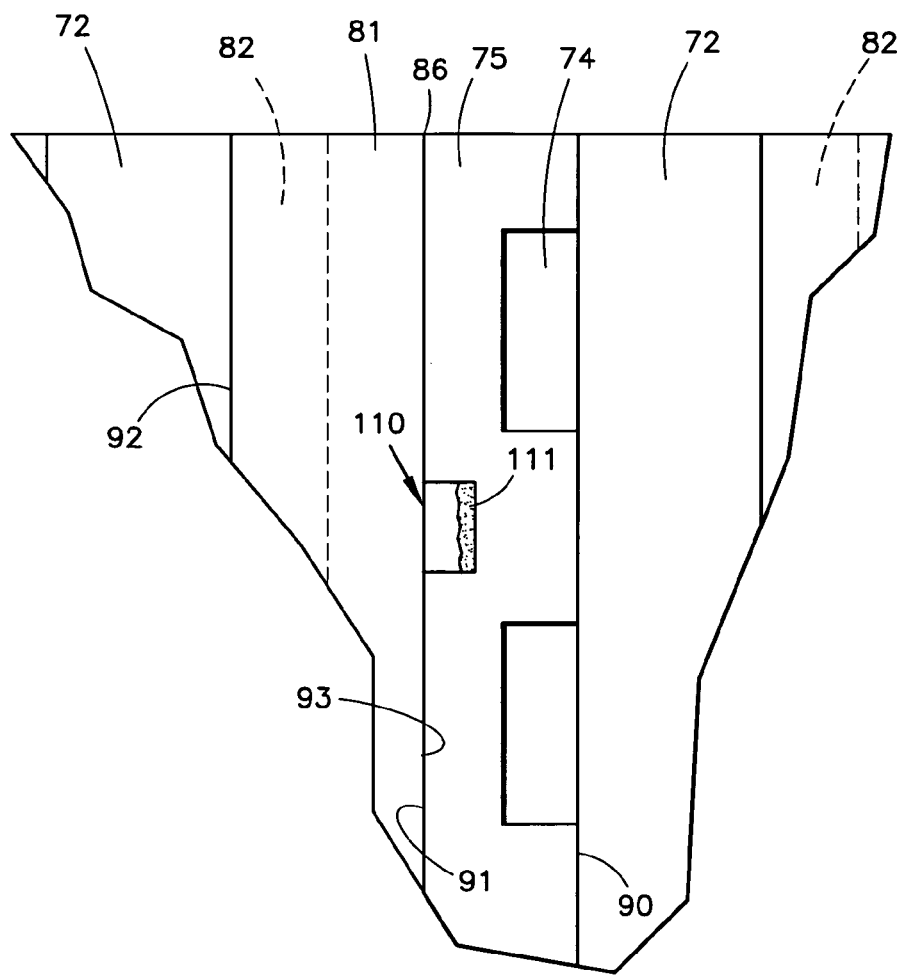
FIG. 20 is a fragmentary, sectioned, side elevation view of a coolant channel having one hydrophobic wall.

Another configuration, illustrated in FIG. 20, employs gas tolerant coolant channels of which one wall 111 has been treated to be hydrophobic, as indicated by the stippling. In FIG. 20, the wall that is treated is parallel to the plane of the second surface 91 of the fuel reactant gas flow field plate 75. However, the hydrophobicity may be applied to any other wall of the channel 110, if desired, to suit any implementation of gas-tolerant coolant flow paths. In FIG. 20, the channel 110 is rectangular; however, it may be some other shape if desired, such as to suit ease of manufacture in the implementation of gas-tolerant coolant flow paths.

Another configuration employs layers which are conductive, highly permeable to water, and including hydrophilicity and hydrophobicity. In one embodiment illustrated in FIG. 21, a hydrophobic layer 114 is disposed between two hydrophilic layers 115, 116; the layers being disposed between the oxidant reactant gas flow field plate 81 of one fuel cell and the fuel reactant gas flow field plate 75 of a fuel cell adjacent thereto. The hydrophilic layers 115, 116 allow for in-plane water distribution and the hydrophobic layer 114 provides a path for gas to collect and flow out through the vent 68 (FIG.

1). If desired, a single hydrophilic layer 115 or 116 may be utilized rather than two hydrophilic layers. In the general case, or in the case where the primary objective is evaporative cooling, the single hydrophilic layer 115 should be adjacent to the oxidant reactant gas flow field plate 81; when the primary objective is assuring hydration of the proton exchange membrane in the unitized electrode assembly 72, the hydrophilic layer 116 should be adjacent to the fuel reactant gas flow field plate 75.

The layers 114-116 may comprise porous carbon fiber layers of the type typically used for gas diffusion layers in fuel cells, with appropriate treatment to render them either hydrophilic or hydrophobic.

Figure 22:
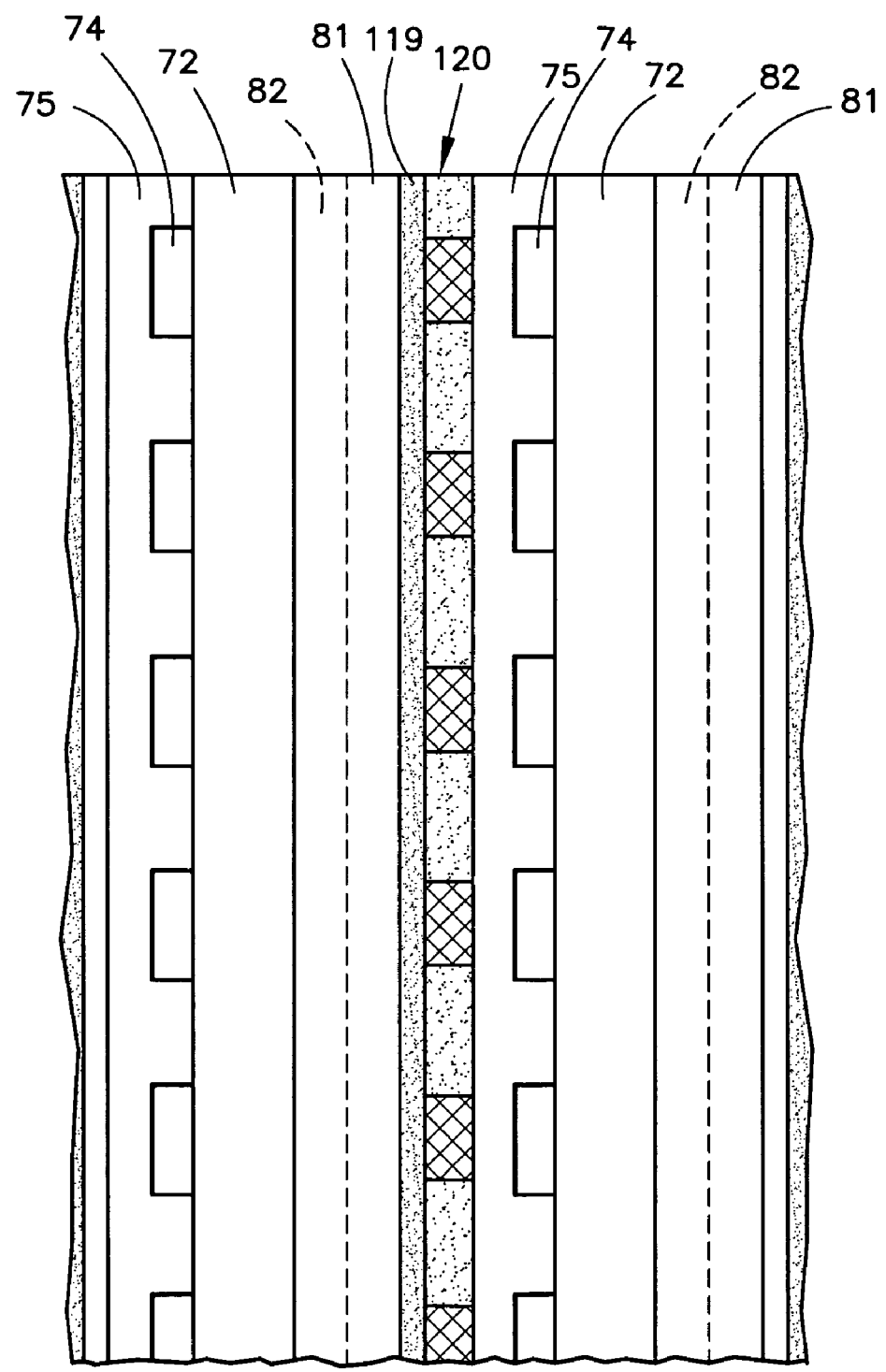
FIG. 22 is partial, sectioned, side elevation view of a pair of fuel cells employing a hydrophilic layer adjacent a hydrophilic/hydrophobic layer disposed between adjacent reactant gas flow field plates.
Figure 23:
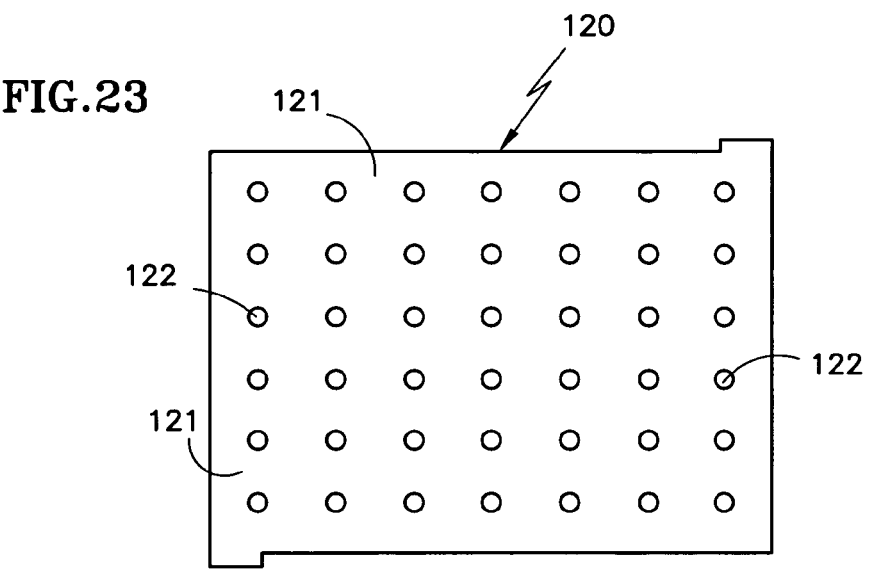
FIG. 23 is a plan view of a hydrophilic/hydrophobic layer of FIG. 22.

In another embodiment illustrated in FIGS. 22 and 23, a conductive porous hydrophilic layer 119 is adjacent to the oxidant reactant gas flow field plate 81, and a layer 120, which is both hydrophilic and hydrophobic is adjacent to the fuel reactant gas flow field plate 75.

The hydrophobic/hydrophilic plate 120 may comprise porous conductive hydrophobic material 121 with a plurality of non-hydrophobic regions 122 therein. The non-hydrophobic regions 122 may be the same material as the rest of the plate 120, which however are treated to make them hydrophilic, such as with a coating of tin. On the other hand, the non-hydrophobic regions 122 may simply be passageways (e.g., punched holes through the material 121) to allow water to pass through the layer 120. Thus, the non-hydrophobic regions 122 may be hydrophilic, or may simply be passageways.

The concepts have been described with respect to fuel cells employing a water coolant, by which is meant a coolant which is substantially pure water. The embodiment of FIG. 20 has been described as having coolant channels in which one wall 111 of each channel 110 has been treated to be hydrophobic with respect to water coolant; if a coolant other than water is utilized, the walls 111 of channels 110 illustrated in FIG. 20 may be more accurately described as liquiphobic, which is defined herein as having an aversion for the coolant liquid, or lacking affinity for the coolant liquid.

Figure 21:
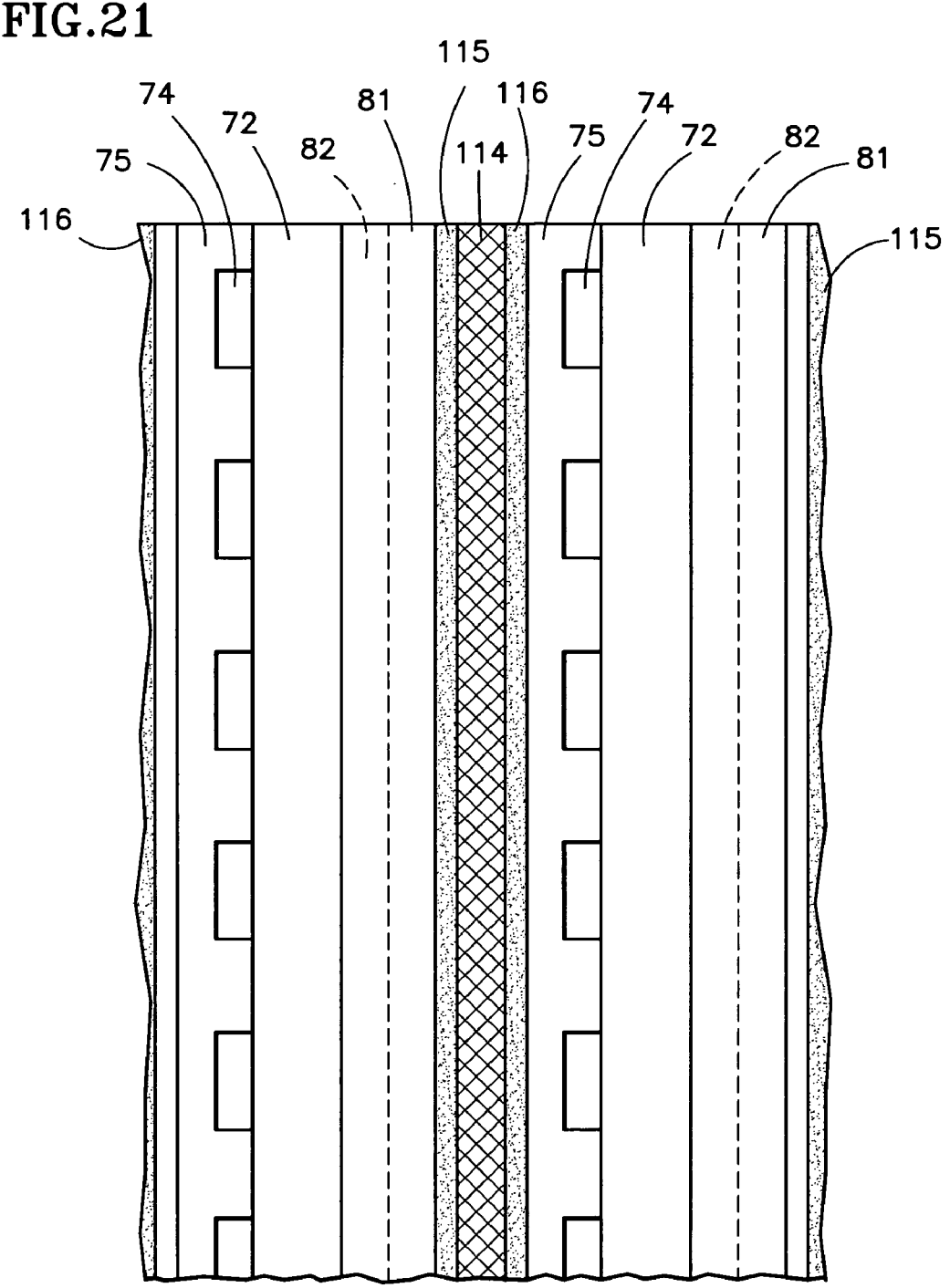
FIG. 21 is a partial, sectioned, side elevation view of a pair of fuel cells employing hydrophilic and hydrophobic layers between adjacent reactant gas flow field plates.

In FIGS. 21 and 22, bipolar plates include at least one hydrophilic layer and at least one additional layer which has hydrophilic and/or hydrophobic regions. In the general case, the bipolar plates may include a liquiphilic layer, and at least one additional layer having liquiphilic and liquiphobic regions. The term liquiphilic is defined herein as having an affinity for the liquid coolant, whether it be substantially pure water or otherwise.

Gas tolerant coolant passageways may be configured in groupings, such as pairs or larger series of alternatively sized or shaped channels. In one embodiment illustrated in FIG. 24, a fuel reactant gas flow field plate 75 has wide channels 127 interspersed with narrow channels 128. As illustrated by the bubbles 131, 132, the gas follows the path of least resistance through the flow field, and the gas therefore preferentially travels through the wide channels 127, rather than the narrow channels 128. The channels could be formed in the oxidant-reactant gas flow field plates, if desired.

Figure 25:
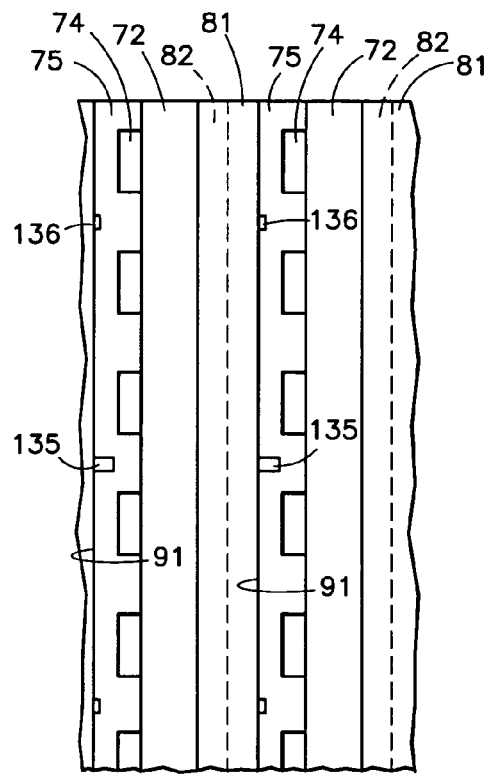
FIGS. 25 and 26 are partial, sectioned, side elevation views of a pair of fuel cells embodying variants of the form shown in FIG. 24.

In another embodiment illustrated in FIG. 25, a variation in the depth of the channels causes the gas to have a proclivity for channels 135 which are deeper than channels 136 extending from the second surface 91 of the fuel reactant gas flow field plates 75.

Figure 26:
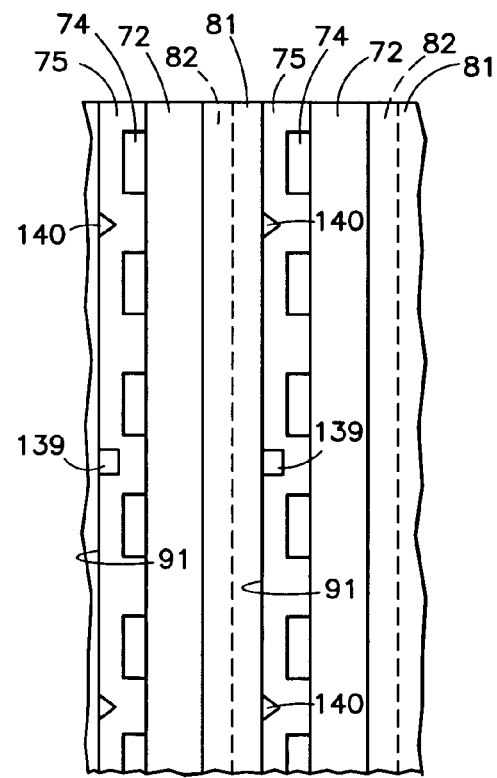

In FIG. 26, another embodiment illustrates channels 139 that are rectangular may be interspersed with channels 140 which are triangular. The gas will have a proclivity for the triangular channels, thus assuring a water flow within the channels 139.

Figure 24:
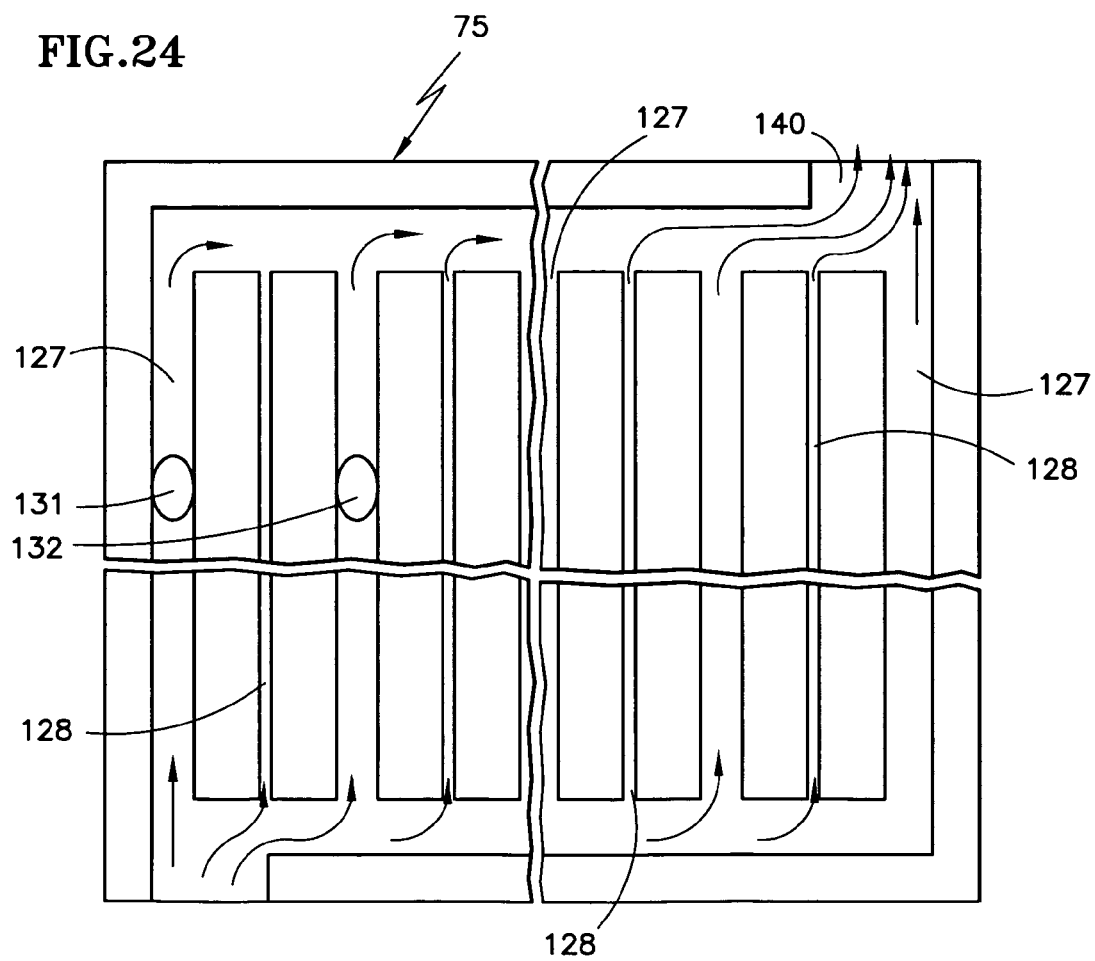
FIG. 24 is a plan view of adjacent narrow and wide coolant channels.

In the embodiments of FIGS. 24-26, the water flow in the channels for which the gas does not have a proclivity will create a pressure drop across the flow field plate thereby urging the gas bubbles to migrate toward the exit 142 (FIG. 24) of the flow field plate 75. In the embodiments of FIGS. 24-26, the likelihood that gas will become trapped only in every other channel will minimize the distance required for in-plane transfer of water within the reactant gas flow field plates. Various other combinations may be utilized: for instance, the deep/shallow combination of FIG. 25 may well be triangular, rather than rectangular; or some may be circular.

Figure 27:
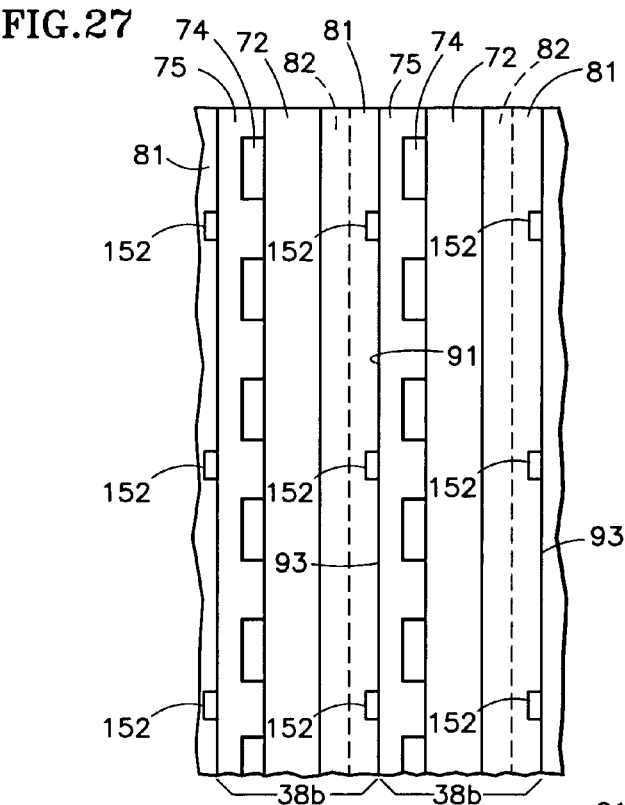
FIG. 27 is a partial, sectioned, side elevation view of a pair of fuel cells employing divergent coolant channels.
Figure 28:
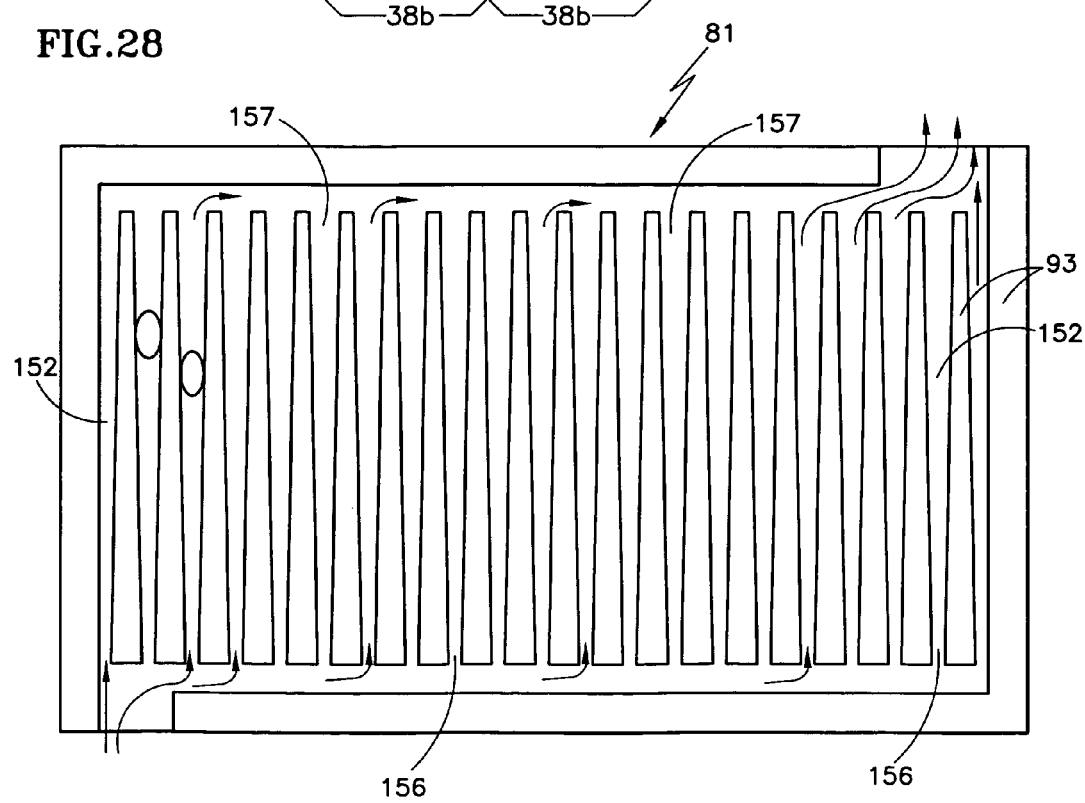
FIG. 28 is a side elevation view of divergent coolant channels of FIG. 27.

In FIGS. 27 and 28, divergent coolant channels 152 extend inwardly from the surface 93 of the oxidant reactant gas flow field plate 81 and are closed off by mating with the first surface 91 of the fuel reactant gas flow field plate 75. The channels 152 may have a square cross section as shown in FIG. 27, or may have any other cross section, so long as the channels diverge in the direction of flow, diverging from inlet ends 156 of the channels 152 to outlet ends 157 of the channels 152, as illustrated in FIG. 28. If the channels 152 have other than a round cross section, the cross section of the bubble 154 will not be round. Depending on the amount of gas in the bubble and the cross sectional area of the channel at any point, the bubble may tend to have a cross section in the direction of flow which is bean-shaped, as illustrated in FIG. 28.

At any position where the bubble 154 is located within the channel, it will try to restore itself to a fully spherical shape, so that elements of the bubble nearer to the exit of the channel will expand, drawing the tail of the bubble along with it, and the bubble will creep toward the channel exit in its search of a spherical shape, seeking to minimize its surface energy. A perfectly spherical bubble will be lubricated by liquid flowing in the coolant channel and will readily flow therein toward the exit.

The diverging channels may each be formed with one edge orthogonal to the edges of the flow plate, and the divergence all created by the angle of a second wall with respect to the edges of the flow plate. The passageways may be formed having a first wall at an angle to the edges of the flow plate and a second wall at an angle with respect to the edges of the flow plate which is greater than the angle of the first wall. The passageways may be serpentine, although it is preferred that the flow is against gravity, at least to some extent, in any portion of the diverging passageways.

The movement of the bubble will be due to the following factors: (a) surface energy minimization causing it to move in a direction where the shape of the bubble will have the minimum surface energy (i.e., spherical); (b) buoyancy force—where the density difference between the lower density of the bubble and the higher density of the surrounding coolant will cause the bubble to move in a direction opposite to the gravitational force; and (c) the flow induced pressure on the bubble due to the coolant flow in the channel. Since any one of the forces listed above may be the dominant one, it may be possible to operate with different stack orientations. In some implementations, the exit for the bubble may not coincide with the exit for the coolant channels. In other words, the bubble may not move in the same direction as the coolant flow. The preferred embodiment has coolant flowing up, against gravity, and the bubble exit coincident with the coolant exit. The coolant flow up in the vertical direction with bubble exit coinciding with the coolant exit is the preferred embodiment.

Although the foregoing embodiments are described as they may be used in conjunction with an evaporatively cooled fuel cell power plant of the type described with respect to FIG. 1 herein, they may be employed in a wide variety of fuel cell systems. Examples include systems described in the aforementioned US publication. For instance, the embodiments herein may be used in fuel cell stacks in which the coolant passageways are dead ended, having no channel outlet, and relying on flow of bubble gas from the coolant, through porous water transport plates and into reactant streams.

The aforementioned patent and patent publication are incorporated herein by reference.

Thus, although exemplary embodiments have been shown and described, it should be understood by those skilled in the art that the foregoing and various other changes, omissions and additions may be made therein and thereto, without departing from the spirit and scope.

We claim:

1. A fuel cell stack comprising:
a plurality of fuel cells having cell assemblies including an electrolyte having an anode and a cathode disposed on respective anode and cathode sides thereof, a fuel reactant gas flow field plate having fuel reactant gas flow channels extending from a first surface thereof adjacent said anode side, and an oxidant reactant gas flow field plate having oxidant reactant gas flow channels extending from a first surface thereof adjacent said cathode side, at least one of said flow field plates being porous and hydrophilic; and
a coolant flow path configured to allow liquid coolant flow, including at least one coolant passageway disposed in or near a second surface of at least one of said flow field plates of each fuel cell, said coolant passageways each having an inlet end and an outlet end, each of said passageways formed by a channel which diverges from said inlet end to said outlet end.

2. A fuel cell stack comprising:
a plurality of fuel cells having cell assemblies including an electrolyte having an anode and a cathode disposed on respective anode and cathode sides thereof, a fuel reactant gas flow field plate having-fuel reactant gas flow channels extending from a first surface thereof adjacent said anode side, and an oxidant reactant gas flow field plate having oxidant reactant gas flow channels extending from a first surface thereof adjacent said cathode side, at least one of said flow field plates being porous and hydrophilic; and
a coolant flow path configured to allow liquid coolant flow, including at least one coolant passageway disposed in or near a second surface of at least one of said flow field plates of each fuel cell, said coolant passageways each having an inlet end and an outlet end, said coolant passageways diverge from said inlet ends to said outlet ends along substantially the entire lengths of said coolant passageways.

* * * * *